United States Patent
Miller et al.

(10) Patent No.: US 10,407,321 B2
(45) Date of Patent: Sep. 10, 2019

(54) SWEEP-FLOW, OIL-DEHYDRATION APPARATUS AND METHOD

(71) Applicant: THOUGHT PRESERVE, LLC, Fallbrook, CA (US)

(72) Inventors: C. Michael Miller, Taylorsville, UT (US); David A. Bell, Farmington, UT (US)

(73) Assignee: THOUGHT PRESERVE, LLC, Fallbrook, CA (US)

(*) Notice: Subject to any disclaimer, the term of this patent is extended or adjusted under 35 U.S.C. 154(b) by 117 days.

(21) Appl. No.: 15/467,262

(22) Filed: Mar. 23, 2017

(65) Prior Publication Data

US 2017/0275188 A1    Sep. 28, 2017

Related U.S. Application Data

(60) Provisional application No. 62/312,246, filed on Mar. 23, 2016.

(51) Int. Cl.
| | |
|---|---|
| *C02F 1/38* | (2006.01) |
| *B04B 11/02* | (2006.01) |
| *B04B 5/04* | (2006.01) |
| *B04B 1/02* | (2006.01) |
| *B01D 17/02* | (2006.01) |
| *C02F 101/32* | (2006.01) |
| *C02F 103/10* | (2006.01) |

(52) U.S. Cl.
CPC .......... *C02F 1/385* (2013.01); *B01D 17/0217* (2013.01); *B04B 1/02* (2013.01); *B04B 5/0442* (2013.01); *B04B 11/02* (2013.01); *C02F 2101/32* (2013.01); *C02F 2103/10* (2013.01)

(58) Field of Classification Search
CPC .. C02F 1/385; C02F 2101/32; C02F 2103/10; B04B 11/02; B04B 5/0442; B04B 1/02; B01D 17/0217
See application file for complete search history.

(56) References Cited

U.S. PATENT DOCUMENTS

| | | | |
|---|---|---|---|
| 2,301,110 | A * | 11/1942 | Clayton ............... B01D 11/048 554/203 |
| 3,410,480 | A | 11/1968 | Fierstine |
| 4,044,943 | A | 8/1977 | Brown |
| 5,948,271 | A | 9/1999 | Wardwell et al. |
| 6,348,154 | B1 | 2/2002 | Stewart |
| 7,060,017 | B2 | 6/2006 | Collier |
| 8,187,474 | B2 | 5/2012 | Freeman |
| 9,433,877 | B2 | 9/2016 | Miller et al. |

(Continued)

OTHER PUBLICATIONS

Exterran, Deep Bed Nutshell Filter Evolution, p. 1-15, 2013.
(Continued)

*Primary Examiner* — David C Mellon
*Assistant Examiner* — Liam Royce
(74) *Attorney, Agent, or Firm* — Pate Baird, PLLC

(57) ABSTRACT

A centrifugal, liquid-liquid separator relies on a sweep flow in excess of the flow rate naturally occurring in the heavy constituent or species being separated out from a lighter species, in order to prevent access by the long-chain polymers of the lighter species to solids that may separate out and make a durable composition of polymers and particles that adheres and compacts against the shell wall of the centrifuge.

20 Claims, 4 Drawing Sheets

(56) References Cited

U.S. PATENT DOCUMENTS

| | | |
|---|---|---|
| 9,527,012 B2 | 12/2016 | Miller et al. |
| 9,737,831 B2 | 8/2017 | Miller et al. |
| 9,908,065 B2 | 3/2018 | Miller et al. |
| 10,011,505 B2 | 7/2018 | Miller et al. |
| 2009/0204419 A1 | 8/2009 | Stewart |
| 2011/0003676 A1 | 1/2011 | Collier et al. |
| 2014/0315704 A1* | 10/2014 | Miller ............... B04B 11/02 494/3 |

OTHER PUBLICATIONS

McGraw Hill Higher Education, Unit Operations of Chemical Engineering, Seventh Edition, p. Chapter 2, p. 39-41, 2005.

Eastern Economy Edition, Transport Processes and Separation Process Principles, Christie John Geankoplis, Fourth Edition, p. 932-939, 2003.

John Wiley & Sons, Department of Chemical Engineering, R. Byron Bird, Warren E. Stewart, Edwin N. Lightfoot, Transport Phenomena, p. 85, 1960.

Wiley-India, Dale E. Seborg, Process Dynamics and Control, Second Edition, Thomas F. Edgar, Duncan A. Mellichamp, p. 159-160 and p. 433-435, 2004.

McGraw Hill, Perry's Chemical Engineers' Handbook, Eighth Edition, Don W. Green, p. 18-114-116, 15-91-93, and 15-96-102, 2008.

High-Tech Consultants, Inc., Oilfield Water-Oil-Solids Separation, Bill Ball, Sep. 19, p. 1-17, 2005.

IOP Publishing, Nanostructured materials for water desalination, T. Humplik, J. Lee, S.C. O'her, B.A. Fellman, M.A. Baig, S.F. Hassan, M.A. Atich, F. Rahman, T. Laoui, R. Karnik, E.N. Wang, p. 1-19, 2011.

\* cited by examiner

302 — 2 gpm Sweep

| | Flow Rates (gpm) | | | Properties |
|---|---|---|---|---|
| | Input Line | Oil Line | Water Line | BS&W (%) |
| 312 → Influent | 100 | 95 | 5 | 5% |
| 310 → Sweep Fluid | 2 | 0 | 2 | |
| 308 → Light Phase (oil) | 93 | 92.3 | 0.744 | ≤ 0.8 |
| 306 → Heavy Phase (water) | 9 | 2.7 | 6.3 | |
| | 102 | 95 | 7 | |
| | ↑ 314 | ↑ 316 | ↑ 318 | ↑ 320 |

FIG. 4

304 — 10 gpm Sweep

| | Flow Rates (gpm) | | | Properties |
|---|---|---|---|---|
| | Input Line | Oil Line | Water Line | BS&W (%) |
| 312 → Influent | 100 | 95 | 5 | 5% |
| 310 → Sweep Fluid | 10 | 0 | 10 | |
| 308 → Light Phase (oil) | 94.5 | 93.744 | 0.756 | ≤ 0.8 |
| 306 → Heavy Phase (water) | 15.5 | 1.3 | 14.2 | |
| | 110 | 95 | 15 | |
| | ↑ 314 | ↑ 316 | ↑ 318 | ↑ 320 |

FIG. 5

SWEEP-FLOW, OIL-DEHYDRATION APPARATUS AND METHOD

RELATED APPLICATIONS

This application claims the benefit of U.S. Provisional Patent Application Ser. No. 62/312,246, filed Mar. 23, 2016, which is hereby incorporated herein by reference in its entirety. This application also hereby incorporates herein by reference U.S. Pat. No. 9,433,877, issued Sep. 6, 2016; U.S. Pat. No. 9,527,012, issued Dec. 27, 2016; U.S. patent application Ser. No. 14/313,392, filed Jun. 24, 2014; U.S. patent application Ser. No. 14/336,220, filed Jul. 21, 2014; and U.S. patent application Ser. No. 14/476,041, filed Sep. 3, 2014. All the foregoing references are hereby incorporated herein by reference.

BACKGROUND

1. Field of the Invention

This invention relates to separators and, more particularly, to novel systems and methods for improving performance of oil dehydrators.

2. Background Art

Liquid separation, from initial settling to purification, is an activity required to meet various objectives. For example, waste water from industrial processes may require remediation before returning the basic water stream into a riparian flow, estuary, lake, sea, or other supply. Similarly, production water generated during production of petroleum, natural gas, or other petroleous materials may require remediation before disposal in any one of several ways.

For example, oil needs to be removed from water before it is re-injected into a disposal well. Otherwise, fouling will reduce the life of the disposal well. Similarly, if industrial contaminants or production water is re-injected into a disposal well, potential ground water contamination may be a consideration requiring removal of certain species of contaminants in the water.

On the other hand, oil may need to be dehydrated of water. Meanwhile, production or other water may contain valuable oil that should be separated from the water for inclusion in the production of a well. Accordingly, water, oil, or both may be separated from each other and purified to an extent specified by technical or market demands. For example, water separation from oil to a volume fraction of less than one percent or a mass fraction of less than one percent may be required to obtain optimum prices for crude oil.

Technologies have been developed for separating species of liquids or disparate phases (where each species is considered to be a separate phase, even though both are in a liquid state). U.S. Pat. No. 6,607,473, herein incorporated by reference herein; discloses certain embodiments of liquid-liquid separators.

As a practical matter, separation processes, specifically liquid-liquid separation processes, are a staple of chemical engineering practice. As a direct result, certain rules, formula, procedures, rules of thumb, and the like may typically be relied upon. Nevertheless, much of settling theory originates in static settling tanks or settling ponds. These are not actually static, but the pond or tank wall itself is static. The flow passes through as the effects of gravity on the differentials of buoyancy between constituents within the flow thereby separate them out, coalesce, or otherwise render them separable from one another.

In the chemical engineering arts, much of settling theory applied to stationary tanks has also been applied to the extent deemed appropriate to rotating separators, such as cylindrical tanks. Cylindrical tanks may have a fixed wall with a moving rotor inside. Other cylindrical tanks may actually rotate in their entirety.

However, prior art systems suffer limitations in actual operation. Cleaning is not the least of these problems. Fouling prevention is desperately needed to improve operations.

BRIEF SUMMARY OF THE INVENTION

In view of the foregoing, in accordance with the invention as embodied and broadly described herein, a method and apparatus are disclosed in one embodiment of the present invention as including a system, apparatus, and method for controlling the development of boundary layers and a dispersion band location.

Accordingly, in an apparatus and method in accordance with the invention, the phenomena have been studied, experimental data have been collected, relationships have been posited and established by experimental data, and a scheme has been developed for keeping petroleum constituents like heavy or long chain hydrocarbons of a dispersion band away from walls. The principle applies to rotating separators in general. In one embodiment, a specific geometry is tested to demonstrate the general principles and the specific performance of that particular geometry.

In certain embodiments, an apparatus in accordance with the invention may include a separator operating to separate out at least one first liquid from at least one second liquid. It may be characterized by an inlet receiving a mixture of the at least one first liquid and the at least one second liquid, where the second liquid is heavier than the first, but is a small fraction or percentage (e.g., 1%-5%, up to about 10%). A dispersion band therein develops between a bulk flow of the at least one first liquid and a bulk flow of the at least one second liquid. A sweep flow of the heavy liquid re-circulates through the separator to assure that a robust boundary layer remains along the entire outer wall. The sweep flow keeps the lighter first liquid away from the outer wall.

In experiments, the separator was a rotating separator. It was shaped as a frustum of a cone, having a tapered wall. The wall extends in an axial direction from an inlet end to an outlet end, progressing from a smaller diameter proximate the inlet end to a larger diameter proximate the outlet end.

The first liquid is measurably different in density from the second, and the more dense liquid of the two carries with it a flow of even heavier solid particles. Other solids of lower density could move to the opposite extreme, including remaining in the dispersion band, depending on their density.

However, the first (lighter) liquid has a tendency to combine with solids to form a persistent fouling difficult to remove from the outer wall. The sweep flow resists by floating the lighter (e.g., oil, heavy hydrocarbons, etc.) away from the wall and the solids.

A corresponding method may include providing a separator, operating to separate first and second liquids from one another, and characterized by an inlet receiving a mixture of the first and second liquids, a dispersion band developing between the first and second liquids, a first outlet discharging the first liquid, and a second outlet discharging the second liquid. Operation of a control system positions the dispersion band away from the outer wall by introducing a sweep flow of the second (heavier) liquid that forms a boundary layer bounding the first (lighter) liquid away from the outer wall.

The dispersion band is held at a location away from the outer wall. Droplets of the second liquid migrate radially outward with the solids through the first liquid into the sweep flow layer. Solids continue migrating radially through the second liquid.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 4 is a chart showing production run data of a 100 gpm system in accordance with the invention under a 2 gpm sweep configuration; and FIG. 5 is a chart of production run data of the system of FIG. 4 operating under a 10 gpm sweep fluid condition.

DETAILED DESCRIPTION OF THE PREFERRED EMBODIMENTS

Figure 1:
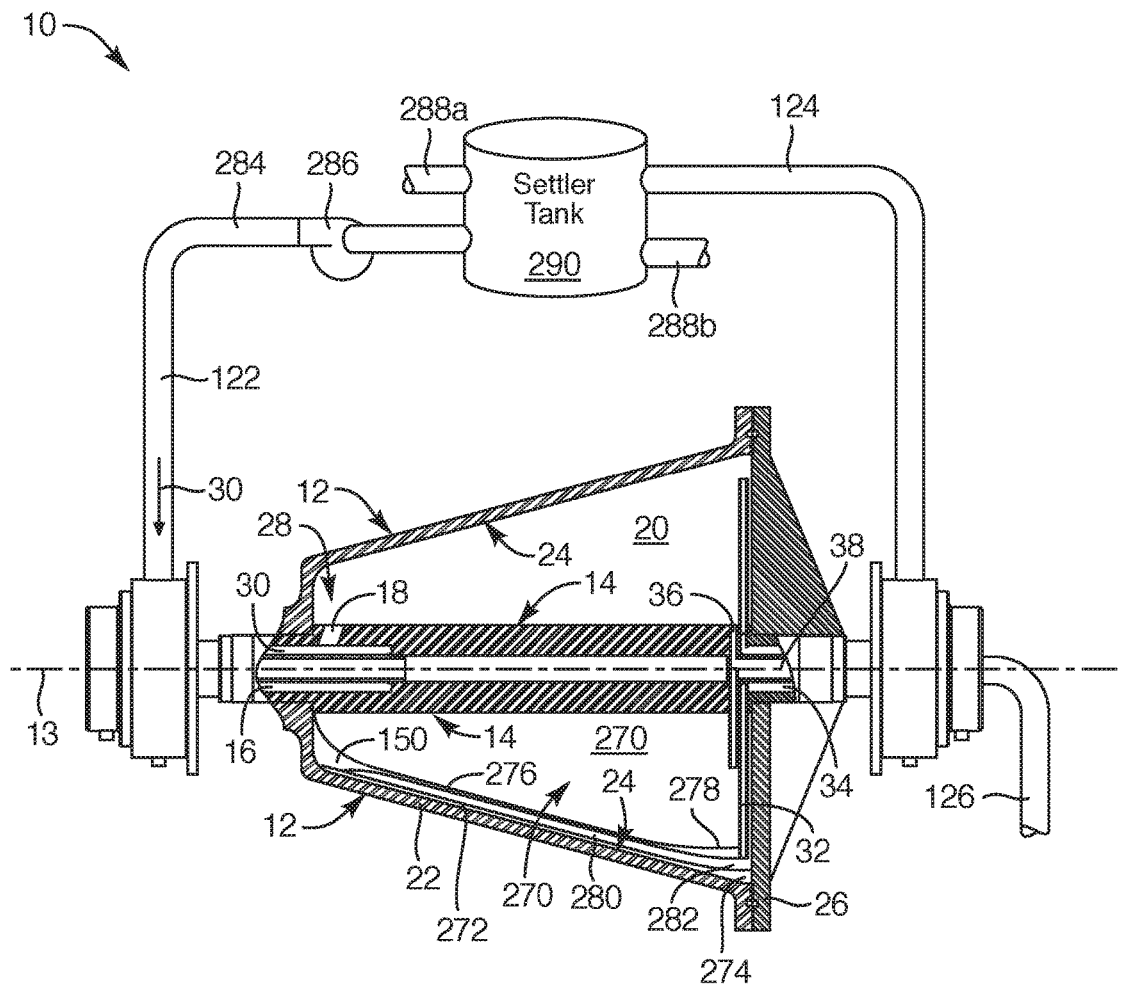
FIG. 1 is a side elevation, schematic, cross-sectional view of a separator in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, while continuing to refer generally to FIGS. 1 through 5, a system 10 may include a centrifuge 12. The centrifuge 12 rotates about a central axis 13. In the illustrated embodiment, the side-elevation, cross section is trapezoidal. This is not the only operational configuration, but does assist in moving sediments settling out of the input.

The centrifuge 12 rotates about the central axis 13, which is also the central axis 13 for a main shaft 14, or rotor shaft 14 supporting the centrifuge 12 on bearings.

An inlet 16 provides a place for a mixture to enter the centrifuge 12 for processing. Meanwhile, the inlet 16 leads into a port 18 or leads to a port 18 passing from inside the shaft 14 into the main cavity 20 of the centrifuge 12.

In operation, the centrifuge 12 operates by rotating at an angular velocity of from about 1,000 rpm to about 2,500 rpm. As a practical matter, mechanical constraints on the construction of the centrifuge 12 will typically render a suitable operating range from between about 1,500 rpm to about 1,800 rpm for optimal performance. The system 10 may operate at a different angular velocity (speed of rotation, rpm's, radians per second, etc.). The instant embodiment illustrated comports with specific field units constructed and operated within the foregoing parameters.

Actual data was taken in a system having an outermost internal diameter of the rotor cavity 20 of about 37 inches, with the minimum diameter at the narrow end thereof of about 18 inches. The overall length of the internal cavity 20 was about 36 inches. In operation, a target throughput was about 100 gallons per minute. This throughput corresponds to approximately 1,000 barrels per shift of from about seven to about nine hours duration. This throughput is influent constituting a combination of production oil, some amount of water, and some amount of sediment.

In one currently contemplated embodiment, the system 10 operates as a dehydrator. In such circumstances, the water constituent is already typically on the order of below ten percent, and often below five percent. In many cases, a dehydration process is desired to improve the quality of oil below one percent of water.

Influent passing through the inlet 16 enters the cavity 20 through the port 18. Following centrifugation, the liquid influent has been exposed to approximately 1,000 g's (units of gravity). This increased acceleration (radial acceleration instead of actual gravity), results in the heavier species, typically water in a production context for petroleum products, accumulating near the outermost diameter of the centrifuge 12 or cavity 20. Accordingly, a pickup tube 32 is provided with an opening 33 or port 33 through which the heavier species (e.g., water) may exit the chamber 20 or cavity 20.

In contrast, the lighter species will accumulate closer to the shaft 14 near the central axis 13 of the centrifuge 12. An output port 36 in the shaft 14 drains the lighter species out to an exit passage 38. Thus, an outlet passage 34 carrying the heavy species out through the shaft 14, and an outlet passage 38 for the lighter species may pass collinearly or coaxially out through the shaft 14 to their respective transport lines, line 124 for the heavy species and line 126 for the light species.

As will become clear hereinbelow, a selected volumetric flow rate of the heavy species traveling through the line 124 will eventually be transported back to be reintroduced into the influent line 122. Typically, the heavy species will be introduced, without undue or enforced mixing, at some point in the line 122. This is best done downstream of any pumping of the content of influent line 122.

As has been discussed in the references incorporated hereinabove by reference, a dispersion band 150 develops in the centrifuge 12. However, in a dehydration condition, operation, or system 10, the dispersion band 150 is located very differently. Typically, a dispersion band 150 establishes itself at some radius 151 (see FIG. 3) from the central axis 13. However, an interesting character of an apparatus 10 in accordance with the invention is the existence of a completely transient condition within the different layers 270, 272, 280.

For example, the layer 270 is typically oil or the lighter species. The layer 272 is a layer of sediments 272 that will eventually accumulate at the outmost radius of the cavity 20. Meanwhile, the layer 280 constitutes water or other comparatively heavier species separated out of the oil 270 constituting the majority of the influent 30.

In operation, a system 10 in accordance with the invention operates by introducing an influent 30 from an incoming line 122 into the cavity 20 by means of the ports 18 traversing between the inlet 16 and the cavity 20. The influent 30 immediately begins to separate out into various species according to weight. Typically, the heaviest material is sediment, which may include silica, and is typically a fine clay 272.

The sediment 272 separates out closest to a wall 22 of the centrifuge 12. In fact, the inner surface 24 of the wall 22 operates to halt radial flow of the sediment 272. Moreover, if the centrifuge 12 is trapezoidal in cross section as illustrated, then the sediment layer 272 or its content 272 tends to drift toward the end wall 26 of the centrifuge 12. Accordingly, an accumulation 274 of the sediment layer 272 tends to grow in the corner between the wall 22 and the end wall 26 or cap 26.

Meanwhile, the heavier hydrocarbons 276 found in the influent 30 will begin to accumulate as far from the central axis 13 of rotation as they can. That location is limited by the wall 22, the heavy species 280, either, or both. Accordingly, these will also begin to form an accumulation 278 near the outermost extent of the oil 270 or lighter species 270.

However, the heavier or water layer 280 is constituted by two types of water or sources of water. It divides or separates the heavy hydrocarbon layer 276 from the surface 24 of the wall 22 of the centrifuge 12. For example, water 280 being separated out from the influent 30 will be lighter than the sediments 272, but heavier than the oil 270 and the heavy hydrocarbons 276. However, in an oil dehydration process, the amount of water 280 directly removable from the influent 30 may be characterized as something between barely significant, and problematic.

For example, if insufficient water 280 is available to be separated out from the influent 30, then the centrifuge 12 is operating off its design set points, and can neither fill the line 124 carrying the water 280 to the settling tank 290, nor coat the inside surface 24 of the wall 22. This creates several problems discussed immediately hereinbelow.

In a better operational embodiment, the layer 280 of water 280 is augmented by pumping through a line 284 driven by a pump 286 from the settling tank 290. This means that an amount of make-up water 280 may be added to create a sweep flow 280. Thus, although the water layer 280 has been discussed so far as though it were all removed from the influent 30, which it may be, it is not necessarily being removed from the influent 30 or separated from the oil 270 in the quantities or at the rate at which it flows and needs to flow through the line 284 into the inlet 16.

Rather, water 280 is accumulated in the tank 290 so that it can be cycled through from the inlet 16 to the retrieval line 124 at a rate much higher than it can be generated or separated out from the influent 30. This permits several benefits. For example, the water layer 280 is established to be flowing at substantially all times during operation of the system 10, and covers the wall 22 from the inlet 16 to the outlet port 33 of the pick up tube 32. By providing a vigorous flow in an axial direction, at a significant velocity, the water layer 280 tends to urge the sediments 272 to move along the surface 24 of the wall 22. Thus, the sediments 272 can accumulate near the cap 26 or end wall 26 of the centrifuge 12.

Moreover, the water layer 280 separates the oil 270, including the heavy hydrocarbons 276 that tend to further separate out therefrom, away from the sediments 272. These two constituents, sediments and heavy hydrocarbons, are not allowed to mix to form a fouling composition.

Figure 2:
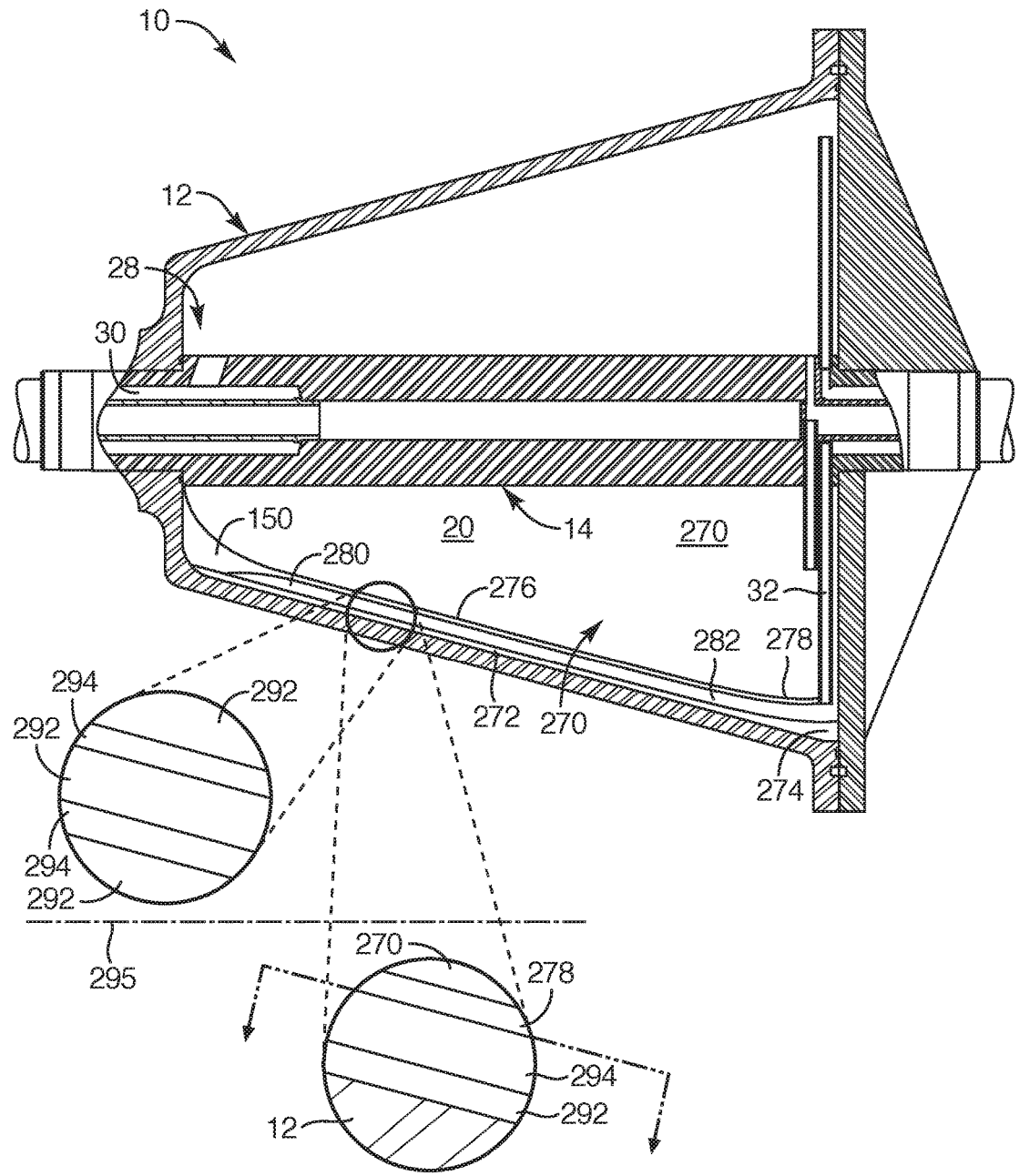
FIG. 2 is a side elevation view thereof under conditions lacking a sweep flow of heavier species (e.g., water)

Referring to FIG. 2, while continuing to refer generally to FIGS. 1 through 5, the system 10 may be operated without the use of sweep water or sweep fluid in the layer 280. In such a case, the layer 280 actually is not a layer, and becomes rather a series of rivulets 294. That is, the sediment 272 when permitted to be in contact with the heavy hydrocarbon layer 276 forms a clay-bitumen composition 292 that becomes very durable, very resistant to disruption, and very difficult to remove from its adhesion to the inner surface 24 of the wall 22 of the centrifuge 12.

The insets of FIG. 2, showing expanded views from an elevation view, cross sectional view, and a top plan view, illustrate that the oil 270 lies above the heavy hydrocarbon layer 278. The water 280, in a side elevation view shows up as a rivulet 294, not a continuous layer. Accordingly, at some locations, the heavy hydrocarbon layer 278 is in direct contact with the sediment layer 292. The sediment layer 292 is not the same as the sediment layer 272 of FIG. 1. Instead, the layer 292 is a composite clay-bitumen layer 292 that is very difficult to remove, or dissociate its constituents.

Across the fold line 295 is seen the top view, in which the rivulets 294 and the composite layer 292 are both present. The rivulets 294 of water 280 are insufficient to completely cover the surface 24 of the wall 22, thereby leaving opportunities for the sediments 272 to embed with the heavy hydrocarbons 278, thus forming the problem layer 292.

One will note the system 10 of FIG. 1 operating with sufficient sweep flow 280 or water layer 280 of sufficient depth to completely coat the sediment layer 272. It immediately isolates the sediment layer 272 from becoming concreted together by contact with heavy hydrocarbons 278.

As an operational matter, the difference in density between the sediments 272 and the oil 270, which constitutes the majority of influent 30, is sufficiently great that the tremendous acceleration of the centrifuge 12 begins a separation of species immediately in the entrance area 28. Sediments 272 and water 280 will immediately begin to separate out toward the wall 22. However, the sweep layer 280 or the additional volume of water flow in the sweep layer 280 is now rendered sufficient, and its separation out is rapid, since it is not actually thoroughly mixed by any means in the influent 30. It immediately separates out and forms the sweep layer 280.

Moreover, the sweep layer 280 separates out a sufficient volumetric flow rate (gallons per minute, cubic feet per minute, cubic centimeters per minute, etc.) to float the heavy hydrocarbon layer 276 radially inward toward the central axis 13 and shaft 14. Thus, the opportunity is simply not available for the amalgamation of the sediments 272 and the heavy hydrocarbons 276.

Figure 3:
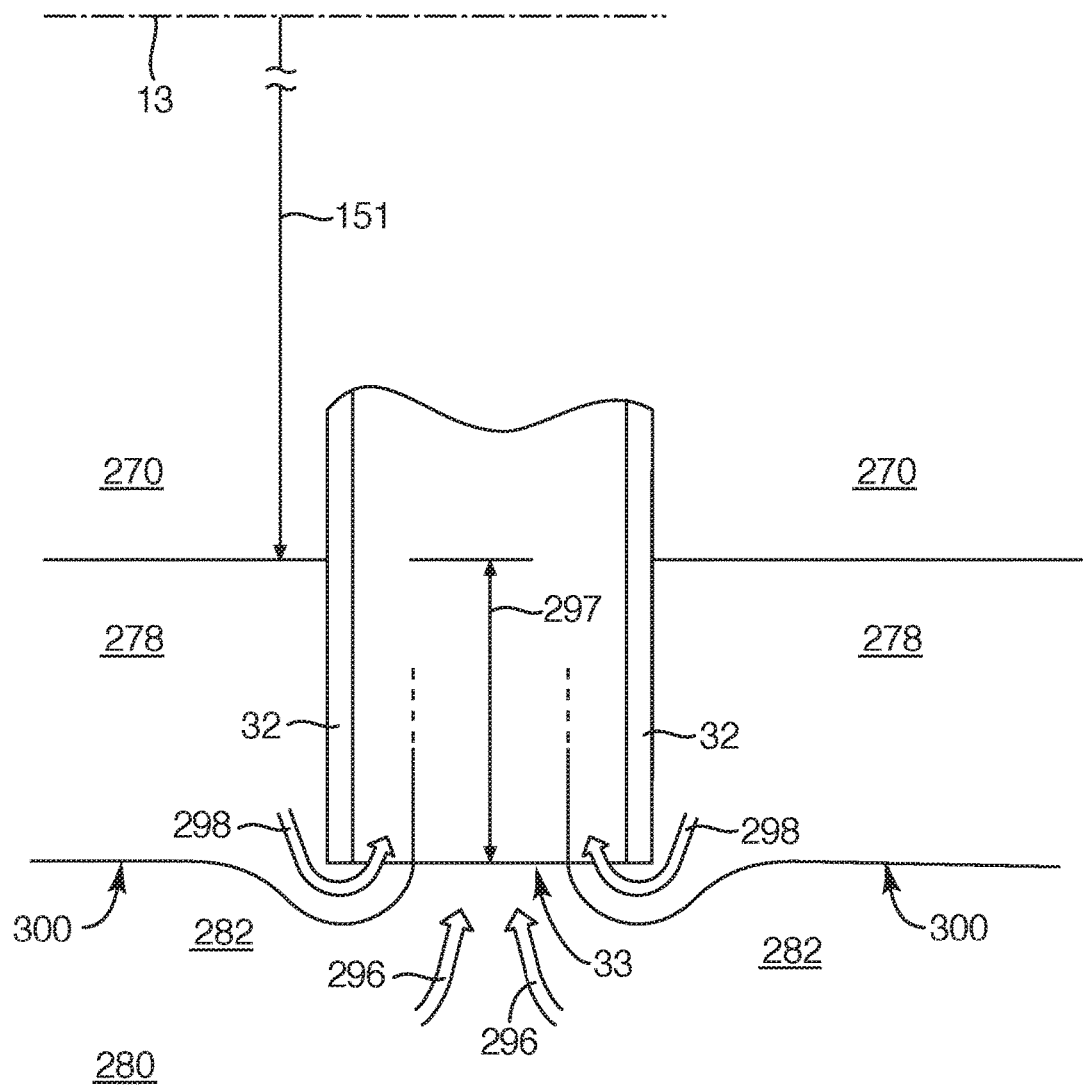
FIG. 3 is a side elevation, cross-sectional view of one embodiment of a heavy species pickup tube at the dispersion band for removing the heavy species (e.g., water), while also inducing an outflow of an intermediate species from the dispersion band.

Referring to FIG. 3, while continuing to refer generally to FIGS. 1 through 5, in one embodiment, a flow 296 of water 280 from the accumulation 282 passes into the pick up tube 32. In the illustrated embodiment, a pick up tube 32 reaches to the water layer 282 or the water accumulation region 282. To do so, the tube 32 must pass through the heavy hydrocarbon accumulation region 278 or heavy hydrocarbon accumulation 278.

The illustrated embodiment is well suited for the tube 32 to pass through the entire thickness 297 of the heavy hydrocarbon accumulation 278 (defined as that portion between the dispersion band radius 151 and outermost extent of the oil 270) and the innermost surface 300 of the water 282 accumulated. Accordingly, a flow 296 of the water from the accumulation 282 will enter the port 33 of the tube 32. Maintaining the opening 33 near the surface 300 between the water accumulation 282 and heavy hydrocarbon accumulation 278 assures that another sweep 298 or another flow 298 of the heavy hydrocarbon accumulation 278 will also be drawn into the port 33.

A benefit of this removal of the heavy hydrocarbon layer 278 or accumulation 278 from the centrifuge 12 is that the dispersion band 150 cannot exceed the operational limits of the system 10. The heavy hydrocarbon accumulation 278 always has a way out of the cavity 20. Thus, the heavy hydrocarbon accumulation 278 does not grow to an unhealthy level to support dehydration of the oil 270 by removal of the water 282. This solution improves over prior art systems, such as U.S. Pat. No. 8,794,448.

As a practical matter, the heavy hydrocarbon accumulation 278 or the heavy hydrocarbon layer 276 is, in effect, a part of the dispersion band 150 between the oil 270 and the water layer 280. The accumulation 278 may actually include chunks, liquids, and the like of the heavy hydrocarbons 276, mixed with some amount of water 280. Thus, odd shapes and sizes of heavy hydrocarbon accumulation 278 may easily be swept (e.g., by fluid drag) by the flow 296 and water 280 into the port 33. The dispersion band radius 151 at which the dispersion band 150 is located can be completely controlled, as discussed in the references incorporated hereinabove by reference. The accumulation 278 of the heavy hydrocarbons 278 may be precisely controlled near the mouth 33 of the tube 32.

Referring to FIGS. 4 and 5, while continuing to refer generally to FIGS. 1 through 5, a chart 302 illustrates actual results from production runs of an apparatus 10 in accordance with the invention under conditions corresponding to FIG. 2. Meanwhile, the chart 304 corresponds to conditions illustrated in FIG. 1.

For example, in the chart 302, the heavy constituent 306 or heavy phase 306 is identified and associated with a series of values 305. The values 305 are arranged in a matrix identifying the heavy phase 306, the light phase 308 (e.g., oil), the amount of sweep fluid 310, and the overall influent 312 before being augmented by the sweep fluid 310.

Along the top legend, the total flow rate 314 is displayed beside the oil flow rate 316 exiting, the water flow rate 318 exiting, and the other properties 320, namely the basic sediments and water (BS&W) 320 resulting in the flow 316 of oil 270 exiting. One will note, for example, in the chart 302, that an influent of 100 gallons per minute contains about 95 gallons per minute of oil, mixed with five gallons per minute of water, constituting approximately five percent BS&W 320. Meanwhile, the values 305 of sweep fluid are zero.

The resulting light phase 308 total 314 is 91 gallons per minute, of which the oil flow 316 is 90.3 gallons per minute. The water flow 318 is 0.7 gallons per minute. The resulting BS&W content 320 is less than 0.8 percent. The heavy phase 306 or water 280 introduced was about nine gallons per minute. Of the total flow rate 314, 4.7 gallons in the oil flow rate 316 is being sent overboard through the oil line 126 exiting the centrifuge 12.

Meanwhile, 4.3 gallons per minute of water flow 318 exit through the takeout line 124, from the tube 32. It passes into the outlet passage 34, and ultimately to the line 124 feeding the settling tank 290. Note, that the somewhat less than 0.8 percent of BS&W 320 is captured within the light phase 308, and may actually not be separable, due to its microscopic nature. For example, particle diameters of plate-like clay particles may be on the order of from about one to about five microns.

It is worth noting that the 4.3 gallons per minute of water flow 318 need not actually go to a settler 290 or settling tank 290. Such a system was inoperative in this example.

Referring to FIG. 5, while continuing to refer generally to FIGS. 1 through 5, a chart 304 illustrates operation of the system 10 for a set of values 305 corresponding to approximately ten percent of the influent 312 being a sweep fluid 310. Again, the references 306, 308, 310, 312 refer to the materials as identified in the charts 302, 304.

A total flow rate 314 of 100 gallons per minute of influent 312 is constituted by about 95 gallons per minute flow rate 316 of oil 270, and about five gallons per minute flow rate 318 of water 280. The BS&W content 320 is about five percent. By adding a sweep fluid 310 or a flow 314 of ten gallons per minute of sweep water 280, the oil flow rate 316 is not increased. The sweep fluid 310 does not contribute thereto. Rather, the sweep fluid 310 passes out with the water flow 318, contributing its full ten gallons per minute.

Meanwhile, the light phase 308 or oil 270 in the total flow 314 constitutes 94.5 gallons, while the flow rate 316 of oil 270 exiting the centrifuge 12 constitutes only 93.7 gallons. This means that the light phase 308 flowing out of the light port 36 and light passage 38 actually contains about 0.8 gallons per minute of water flow 318. One will not that this still results in better than 0.8 percent BS&W 320 in the outgoing passage 38 carrying oil 270.

Finally, one will note that the heavy phase 306 has a flow of about 15.5 gallons per minute of the total flow 314, with 1.3 gallons per minute in the oil flow 316 exiting the centrifuge 12, with 14.2 gallons per minute exiting with the water flow 318. Accordingly, the charts 302, 304 show various improvements in performance. For example, in the oil flow rates 316, and water flow rates 306 one will note that the chart 304 passes only 1.3 gallons per minute of oil in the water, while the chart 302 shows 4.7 gallons per minute of oil in the water flow rate 306. Dehydration seeks to minimize the amount of the heavy phase (water) exiting in the oil flow 316 and minimize oil in the water flow 306. The test using a sweep fluid 310 decreased oil in the water by about two thirds.

That is, the heavy phase 306 exiting out the line 124 carries 4.7 gallons per minute of entrained or mixed oil flow 316. In contrast, the amount of the heavy phase 306 in the chart 304 passing through the line 124 carries only 1.3 gallons per minute of oil as a pollutant or recoverable material.

Likewise, the chart 302 illustrates that the amount of the light phase 308 is 0.7 gallons per minute. Meanwhile, the water is 4.3 gallons per minute out the heavy phase 306 exiting. In contrast, the chart 304 illustrates that the amount of oil flow 316 exiting with heavy phase 306 is 1.3 gallons per minute, a reduction of more than two thirds. Moreover, the amount of water exiting with the heavy phase 306, as a water flow 318 in the heavy phase 306, is 14.2 gallons per minute, almost exactly the amount extracted before, plus the sweep flow amount.

In a nutshell, the removal of water or the dehydration process thus removes very nearly the same amount of water (4.2 gallons, rather than 4.3 gallons, but results in two thirds less oil in the exiting water. Thus, less oil is wasted, and the dehydration process is completely effective.

Moreover, the plating out or coating out of the clay-bitumen layer 292 no longer occurs. It has been found that the sediment layer 272 breaks up readily, since it actually contains only sediment 272. Thus, the difficulty of cleaning is greatly simplified. Moreover, the sweep flow 280 of water 280 tends to sweep the free particles of the sediment layer 272 toward the sediment accumulation 274. Thus, the sediments 274 may be readily removed through cleaning procedures near the cap 26 or through ports in the cap 26.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for maintaining centrifugal separator walls substantially free from fouling by an amalgamation of sediments and hydrocarbons separated from a mixture comprising a light component, heavy component, and solid component as particles, during dehydration of the light component constituting an order of magnitude more than the heavy component in the mixture, the method comprising:

providing a centrifuge comprising a shell, the shell having an outer wall defining an interior surface, being rotatable about a centerline passing axially therethrough, and defining a cavity bounded in a radial direction by the interior surface;

providing an inlet at a first, inlet end, a first outlet, and a second outlet at a second, outlet end, all in fluid communication with the cavity;

introducing the mixture into the cavity through the inlet, the mixture comprising a heavy component, a light component, both liquids, with the light component constituting a majority of the mixture by an order of magnitude over the heavy component, and a solid component, wherein the heavy component is a liquid insufficient in quantity to isolate the solid component from the light component at the interior surface, the light component is a liquid, and the solid component is particles;

introducing a makeup liquid into the cavity, in a quantity, density, and sufficiently unmixed condition to form and maintain a boundary layer between the inlet end and the outlet end, constituting the makeup liquid, along the inside surface and effective to isolate the solid component from the light component along most of the interior surface.

2. The method of claim 1, comprising establishing a dispersion band containing a portion of the light component and a portion of the heavy component, separated from the interior surface by the makeup liquid.

3. The method of claim 2, comprising recycling the makeup liquid from the second outlet to the inlet.

4. The method of claim 3, comprising removing a portion of the dispersion band through the second outlet by entrainment with the heavy component proximate the interior surface.

5. A method of keeping walls of a centrifugal separator free from compacted mixtures of light species and solid species being separated therein in a dehydration process for the light species constituting a majority of the mixture, the method comprising:

selecting a separator operable as a centrifuge having a shaft and shell, the shell having an inner surface defining a cavity therebetween, all rotating about a centerline thereof defining an axial direction, and length therealong extending from an inlet end to an outlet end, and a radial direction orthogonal to the centerline, the centrifuge including, at the inlet end, an inlet capable of delivering into the cavity a mixture comprising solids, constituting particles, a light component, constituting a light fraction thereof, and a heavy component constituting a heavy fraction thereof, the heavy fraction being insufficient to isolate the light component from agglomerating with the particles at the inner surface;

providing proximate an outlet end of the separator a first outlet, operably connected to receive from the cavity the light component from proximate the shaft, and a second outlet, operably connected to receive from the cavity the heavy component from proximate the inner surface;

resisting agglomeration of the solids with the lighter species by providing to the cavity a makeup fluid in a quantity and density effective to form a boundary layer, constituted principally by the makeup fluid, isolating the light component from the solids along the inner surface between the inlet end and the outlet end.

6. The method of claim 5, wherein the light species constitutes more than 90% of the mixture, and the method comprises passing through the second outlet the makeup liquid and substantially all the heavy fraction separated from the mixture.

7. The method of claim 5, comprising discharging the heavy fraction and the makeup fluid into the source of the makeup fluid.

8. The method of claim 5, comprising recycling the heavy fraction and the makeup fluid through a loop proceeding from the second outlet to the source of the makeup fluid, constituting a tank operably connected and configured to buffer a quantity of at least one of the heavy component and the makeup liquid.

9. The method of claim 5, comprising establishing a dispersion band in the centrifuge separated from the inside wall by the makeup liquid along substantially the entire length thereof.

10. The method of claim 5, comprising selecting the makeup liquid to be independent from the heavy species in the mixture and unmixed with the mixture.

11. The method of claim 5, further comprising separating the solid fraction from the inner surface by collecting the solid fraction through the second outlet with the heavy component.

12. The method of claim 5, comprising separating, by the makeup liquid a solid fraction, constituting a majority of the particulate matter, radially outside from the light component and radially inside the heavy component and the makeup liquid, along a majority of the inner surface.

13. The method of claim 12, comprising separating a long chain fraction from the light fraction within a dispersion band between the light component and the boundary layer.

14. The method of claim 13, comprising drawing a portion of the long chain fraction out of the dispersion band by entrainment with a portion of the heavy fraction.

15. The method of claim 14, comprising drawing the heavy fraction from the cavity through a pickup tube having an outlet extending radially outward to a position proximate the inside surface.

16. The method of claim 14, wherein the long chain fraction comprises a portion of the light species from the dispersion band and coating a portion of the solid component to thereby be more dense than the light species and less dense than the heavy species sufficiently to entrain with the heavy component into the second outlet.

17. The method of claim 5, wherein the heavy species is production water and the light species is petroleum being dehydrated to meet a market specification establishing a maximum amount of basic solids and water permissible therein.

18. The method of claim 5, wherein the heavy species is production water native to production of the light species, which is petroleum, and the makeup liquid is water independent from the heavy species.

19. A method for maintaining an inner surface of a centrifugal separator substantially free from aggregated compositions of light components and solids during dehydration of a flow dominated by oil content, the method comprising:

providing a centrifuge comprising a shell, and shaft therethrough, defining an interior cavity therebetween, all rotatable about a centerline passing axially therethrough, the cavity operably connected to an inlet at an inlet end of the cavity, and a first outlet and second outlet at an outlet end of the cavity opposite the inlet end;

introducing, through the inlet, a mixture to be dehydrated, the mixture comprising a heavy component and a light component, as liquids, and a solid component as particles, wherein a heavy fraction of the mixture, constituting the heavy component, is insufficient to isolate the particles from the light component, constituting an overwhelming majority of the mixture, along the inner surface;

introducing a makeup liquid into the cavity in sufficient quantity, density, purity, and unmixed condition with respect to the flow to constitute a boundary layer of the makeup liquid isolating the solid component from the light component along the interior surface between the inlet end and the outlet end.

20. The method of claim 19, comprising:

establishing a dispersion band containing the light component and heavy component, extending between the inlet end and outlet end, between the shaft and the inner surface, and affirmatively separated from the interior surface by the makeup liquid;

recycling the makeup liquid by collecting the heavy component and the makeup liquid from the second outlet into a collection tank; and removing a portion of the light species, containing a portion of the solids, from the dispersion band by moving the dispersion band sufficiently toward the inside surface to entrain the portion of the light component into the makeup liquid exiting the separator through the second outlet.

* * * * *